United States Patent
Koons (10) Patent No.: US 7,704,389 B2
(45) Date of Patent: Apr. 27, 2010

(54) APPARATUS FOR GROUNDWATER REMEDIATION

(75) Inventor: Brad Koons, St. Paul, MN (US)

(73) Assignee: Leggette, Brashears & Graham, Inc., St. Paul, MN (US)

( * ) Notice: Subject to any disclaimer, the term of this patent is extended or adjusted under 35 U.S.C. 154(b) by 0 days.

(21) Appl. No.: 12/333,962

(22) Filed: Dec. 12, 2008

(65) Prior Publication Data

US 2009/0090666 A1   Apr. 9, 2009

Related U.S. Application Data

(62) Division of application No. 11/270,572, filed on Nov. 10, 2005, now Pat. No. 7,476,320.

(60) Provisional application No. 60/626,889, filed on Nov. 12, 2004.

(51) Int. Cl.
*C02F 3/00* (2006.01)
(52) U.S. Cl. .................................................. 210/220
(58) Field of Classification Search ................ 210/747, 210/220
See application file for complete search history.

(56) References Cited

U.S. PATENT DOCUMENTS

| | | | |
|---|---|---|---|
| 3,846,290 A | 11/1974 | Raymond | |
| 4,401,569 A | 8/1983 | Jhaveri et al. | |
| 5,302,286 A * | 4/1994 | Semprini et al. | 210/610 |
| 5,425,598 A | 6/1995 | Pennington | |
| 5,431,861 A | 7/1995 | Nagahiro et al. | |
| 5,620,593 A | 4/1997 | Stagner | |
| 5,674,312 A | 10/1997 | Mazzei | |
| 5,690,173 A | 11/1997 | Abdul et al. | |
| 5,951,921 A | 9/1999 | Koganezawa et al. | |
| 6,143,370 A | 11/2000 | Panagiotou et al. | |
| 6,174,108 B1 * | 1/2001 | Suthersan | 405/128.15 |
| 6,183,646 B1 | 2/2001 | Williams et al. | |

(Continued)

FOREIGN PATENT DOCUMENTS

WO    9203218    3/1992

OTHER PUBLICATIONS

Evans, G. M., et al., "Mass transfer in a confined plunging liquid jet bubble column," Chemical Engineering Science 54(1999) 4981-4990.*

(Continued)

*Primary Examiner*—Chester T Barry
(74) *Attorney, Agent, or Firm*—Novak, Druce + Quigg, LLP (57) ABSTRACT

A process for in situ groundwater decontamination within a subsurface region of earth includes: directing a liquid feed stream through a first conduit; injecting a treatment gas into the first conduit and/or a second conduit; discharging the liquid feed stream downwardly from the first conduit through an orifice restriction into the second conduit to form a confined plunging liquid jet gas and liquid contact zone in the second conduit; dissolving at least a portion of the treatment gas into the liquid feed stream in the contact zone to form an enhanced gas concentration liquid stream; passing the enhanced gas concentration liquid stream downwardly from the contact zone; and passing the enhanced gas concentration liquid stream from the second conduit into the groundwater. A device for performing this process is also disclosed.

22 Claims, 8 Drawing Sheets

U.S. PATENT DOCUMENTS

| | | | |
|---|---|---|---|
| 6,357,727 | B1 | 3/2002 | Cho |
| 6,561,497 | B2 | 5/2003 | Newman |
| 6,805,798 | B2 | 10/2004 | Kerfoot |
| 6,818,136 | B1 | 11/2004 | Marek |
| 7,100,683 | B2 * | 9/2006 | Heilmann et al. ............ 166/68 |
| 2003/0155309 | A1 * | 8/2003 | Schindler .................... 210/747 |
| 2006/0086663 | A1 * | 4/2006 | Chowdhury et al. ........ 210/620 |

OTHER PUBLICATIONS

Evans, G. M., et al., "Performance of confined plunging liquid jet bubble column as a gas-liquid reactor," Chemical Engineering Science 56(2001) 1151-1157.*

Atkinson, B. W., et al., "Increasing gas-liquidcontacting using a confined plunging liquid jet," J Chem Technol Biotechnol 78:269-275 (online 2003).*

Jakubowski, C. A., et al., "Ozone Mass Transfer in a Confined Plunging Liquid Jet Contactor," Ozone Science & Engineering, vol. 25, pp. 1-12 (2003).*

G. M. Evans et al., "Mass Transfer in a confined plunging liquid jet bubble column", 1999, pp. 4981-4990.

Craig A. Jakubowski et al., "Ozone Mass Transfer in a Confined Plunging Liquid Jet Contactor", 2003, pp. 1-12.

* cited by examiner

FIGURE 1

EXPERIMENTAL OZONE DECAY DATA
AQUEOUS CONCENTRATION OF OZONE IN MUNICIAPAL WATER OVER TIME

APPARATUS FOR GROUNDWATER REMEDIATION

This is a Divisional of U.S. patent application Ser. No. 11/270,572, filed Nov. 10, 2005, incorporated herein by reference in its entirety, which claims priority from U.S. provisional patent application No. 60/626,889 filed Nov. 12, 2004, incorporated herein by reference in its entirety.

FIELD OF THE INVENTION

The present invention relates to processes and apparatus for bioremediation of groundwater. The present invention also relates to use of ozone in an injection well and surrounding aquifer.

BACKGROUND OF THE INVENTION

Numerous locations in the world have been affected by chemical releases to the subsurface. These chemical releases often contaminate ground water in the vicinity of the chemical release, which may negatively impact human populations and wildlife. The contamination problem is especially problematic in industrialized nations where storage and transport of chemicals is widespread. However, in many nations work is ongoing to clean up the contaminated ground water using a number of remediation technologies.

One promising technology for clean up of ground-water systems is in-situ detoxification of the contamination by microorganisms. This technology has been proven effective for a number of contaminants including petroleum hydrocarbons, fuel additives such as ethanol and methyl-tertiary butyl alcohol, and chlorinated organic compounds. The contaminant compounds are processed metabolically by the microbes and transformed into innocuous end products. Two classes of compounds are required for bacterial metabolism; electron donors and electron acceptors. Microbes generate energy through an internal enzymatic process that couples consumption of electron donors with respiration of electron acceptors. Many contaminants amenable to bioremediation can be characterized into one of these two categories. The most common electron donor contaminants are petroleum hydrocarbons, which include the solvents benzene, toluene, ethylbenzene, and xylene. Common electron acceptor contaminants include nitrate, perchlorate, and chlorinated hydrocarbons like perchloroethene, trichloroethene, and carbon tetrachloride.

Bioremediation can occur naturally, however, it is often preferential to increase the rate of bioremediation by modifying the subsurface environment to be more favorable for biological activity. In order to do this, harmless chemical compounds that stimulate biological uptake of contaminants are added to the contaminated aquifer. This is typically accomplished by injecting water-based solutions of the required compounds into the contaminated aquifer.

Electron Acceptors

Electron acceptor compounds are added to aquifers impacted by electron donor compounds. The most energetic biological reactions are aerobic reactions that occur when microorganisms couple respiration of oxygen, which is an electron acceptor, with consumption of an electron donor. Because aerobic microbial reactions are more energetic than respiration of anaerobic electron acceptors such as nitrate, sulfate, and carbon dioxide, aerobic bioremediation progresses at a faster rate than anaerobic bioremediation. Additionally, injecting compounds such as nitrate and sulfate into the aquifer can result in a secondary form of contamination (i.e. nitrate and sulfate contamination) if electron acceptor uptake is incomplete.

Electron Donors

It is desirable to add electron donor compounds to aquifers contaminated with electron acceptor compounds. There are a number of electron donors that can be used for bioremediation. Suthersan (2003) describes a system where solid and liquid carbohydrates such as sugar, molasses, fruit juices, and sucrose are dissolved in water and added to the subsurface as an electron donor. Newell (1997) similarly describes a method for bioremediation by which hydrogen in gaseous or dissolved form is added to the subsurface. The hydrogen stimulates microbial activity and increases the rate of electron acceptor uptake.

Electron donors and electron acceptors may be added simultaneously to induce cometabolic degradation of contaminants. One of the common injection combinations is injection of dissolved oxygen as an electron acceptor and dissolved methane as an electron donor. These compounds stimulate a class of microbes called methanotrophs. In addition to consuming oxygen and methane introduced into their environment, contaminant compounds are broken down by broad activity enzymes produced by the methanotrophs.

Fouling in Bioremediation Systems

Solutions of electron acceptors and electron donors are typically added to the subsurface through a network of injection wells, infiltration trenches, or leach fields. A primary maintenance concern for remediation systems that are based on water injection into aquifers is plugging of the injection network. A significant cause of fouling in enhanced bioremediation injection systems is growth of bacteria within the injection borehole and/or infiltration trench and the surrounding aquifer. This type of fouling is referred to as biofouling. Implementing a mechanism to reduce the growth and proliferation of microorganisms responsible for the biofouling can reduce maintenance costs due to biofouling.

Sterilization of the injection well and surrounding aquifer materials is one strategy for reducing biofouling.

It would be desirable to employ ozone as a biocide because ozone is a very effective biocide that, when dissolved in water at milligram per liter concentrations, destroys most microorganisms by lysing their cellular membranes through oxidation reactions.

However, delivery of ozone to the subsurface is problematic due to the reactive nature of ozone. Autocatalytic destruction of ozone occurs once it is dissolved in water, which means its effectiveness as a biocide decreases over time. The ozone half-life is dependant on a number of factors including the concentration of dissolved ozone and dissolved organic and inorganic species in the contact water. The ozone half-life, which is typically on the order of minutes, decreases as the concentration of dissolved constituents increases. As a result, the half-life of ozone is greater in distilled water than typical municipal water, and in turn greater in typical municipal water than a typical ground water. In heavily contaminated ground waters the half-life of dissolved ozone is too short to be measured by standard techniques.

Figure 1:
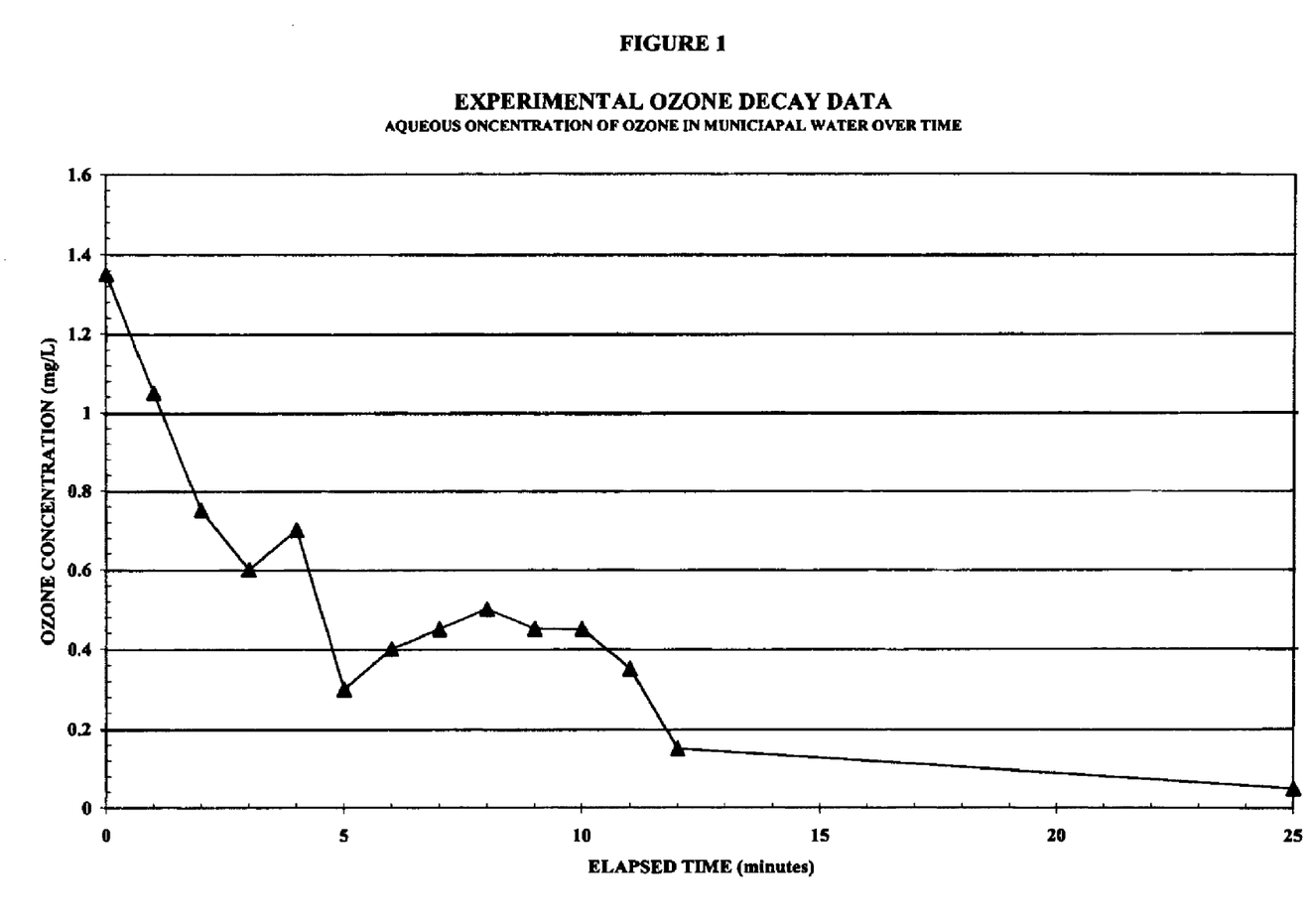
FIG. 1 shows a graph of ozone data.

The inventor determined the half-life of ozone in typical municipal water by using standard field techniques. Ozone was dissolved in municipal water and the concentration of dissolved ozone measured over time. FIG. 1 is a graph of the ozone data. From this experiment it was determined that the half-life of the ozone in the representative municipal water was approximately 5 minutes. A second experiment was conducted where the ozone gas was dissolved in petroleum-impacted ground water. Though the ozone contacting process was identical, no ozone was detected in the impacted ground water as a result of instantaneous depletion of the reactivity of the ozone, which was quenched through spontaneous reactions with the dissolved petroleum compounds. Because most ground-water injection remediation systems centralize process equipment in one location and distribute injectant from that central location to the injection well/infiltration trench network, the residence time of the injectant in the piping network can be on the order of hours. In this type of system, the reactivity of the beneficial ozone is depleted by the time ozone amended water reaches the injection network. In order for the ozone to be effective as a biocide, the gas/liquid contacting process must occur at the point of application rather than at the centralized equipment location.

Gas Contacting with High Purity Gas

Adding gasses to a contaminated aquifer to enhance bioremediation is problematic due to the low solubility of many gasses in water at common temperatures. The maximum concentration of dissolved oxygen in water in contact with atmospheric air at 15 degrees Celsius and low salinity is 10.1 milligrams per liter (mg/L). The amount of dissolved oxygen that must be introduced into the subsurface to completely remediate the target contaminants is a function of the mass of contamination to be treated and the amount of oxygen required for full oxidation of the target contaminants. For petroleum hydrocarbons, the stoichiometric oxygen requirement is three to four moles of oxygen for biological oxidation of one mole of petroleum hydrocarbon. In addition mass of the oxygen required to remediate the hydrocarbons, it is typical that an excess of oxygen must be supplied to satisfy abiotic oxygen demands. Therefore, for an extensive petroleum hydrocarbon release, the volume of air saturated water that must be introduced to the subsurface to satisfy the biological oxygen requirement for transformation of the hydrocarbons can number in the millions or billions of liters.

The total volume of injectant required for bioremediation can be reduced by increasing the dissolved oxygen concentration of the injectant. Dissolution of gasses in liquid is achieved by contacting the gasses to be dissolved with the liquid. The final concentration of a dissolved gas is dependant on the volume of gas in the contacting process, the efficiency of the contacting process, and the ratio (partial pressure) of the gas in the contacting mixture. Assuming that an excess volume of gas is provided to a 100 percent efficient contacting process, the final concentration of gas in liquid is dictated by Henry's law, which can be expressed as:

$S = k_H P$ $S$ = solubility of the gas (mol/L)

$k_H$ = Henry's law constant [(mol/L)/atm]

$P$ = partial pressure of the gas (atm)

Air is a mixture of a number of gasses. The primary components of air are nitrogen and oxygen, which account for approximately 78 and 21 percent, respectively, of the total gas. As discussed above, the maximum concentration of dissolved oxygen in contact with air at 15 degrees Celsius is 10.1 milligrams per liter. Increasing the ratio of oxygen in the contact gas to 100 percent increases the partial pressure of the oxygen in contact with the water by approximately five-fold. Therefore, approximately 48 milligrams per liter of oxygen can be dissolved in water at 15 degrees Celsius.

Increasing the concentration of dissolved gas in a contacting process by using high-purity gas is relatively straightforward. However, gasses used for remediation such as oxygen, methane, and propane have costs associated with them. Because large volumes of these gasses are required for the aquifer remediation strategies discussed above, it is advantageous to conduct gas/liquid contacting processes as efficiently as possible to reduce the amount of gas wasted in the process and, as a result, overall cost.

Gas Contacting Processes

There are a number of methods for gas/liquid contacting for low viscosity liquids. Among the traditional gas/liquid contacting methods are bubble columns, stirred vessels, static in-line mixers, U-tube columns, and plunging jets. A refinement of the plunging jet gas contacting method is a confined plunging liquid jet (CPLJ) contactor. Confined plunging liquid jets are described in the articles, Evans, et al., Mass Transfer in a Confined Plunging Liquid Jet Bubble Column, Chem. Eng. Sci. 54 (1999) 4981-4990, and Jakubowski, et al., Ozone Mass Transfer in a Confined Plunging Liquid Jet Contactor, Ozone Science and Engineering, Vol. 25, pp. 1-12 (2003), both of which are incorporated herein by reference in their entirety.

In this type of contactor, a high-speed stream of liquid is generated by passing pressurized liquid through an orifice smaller than the upstream pipe diameter.

Figure 2:
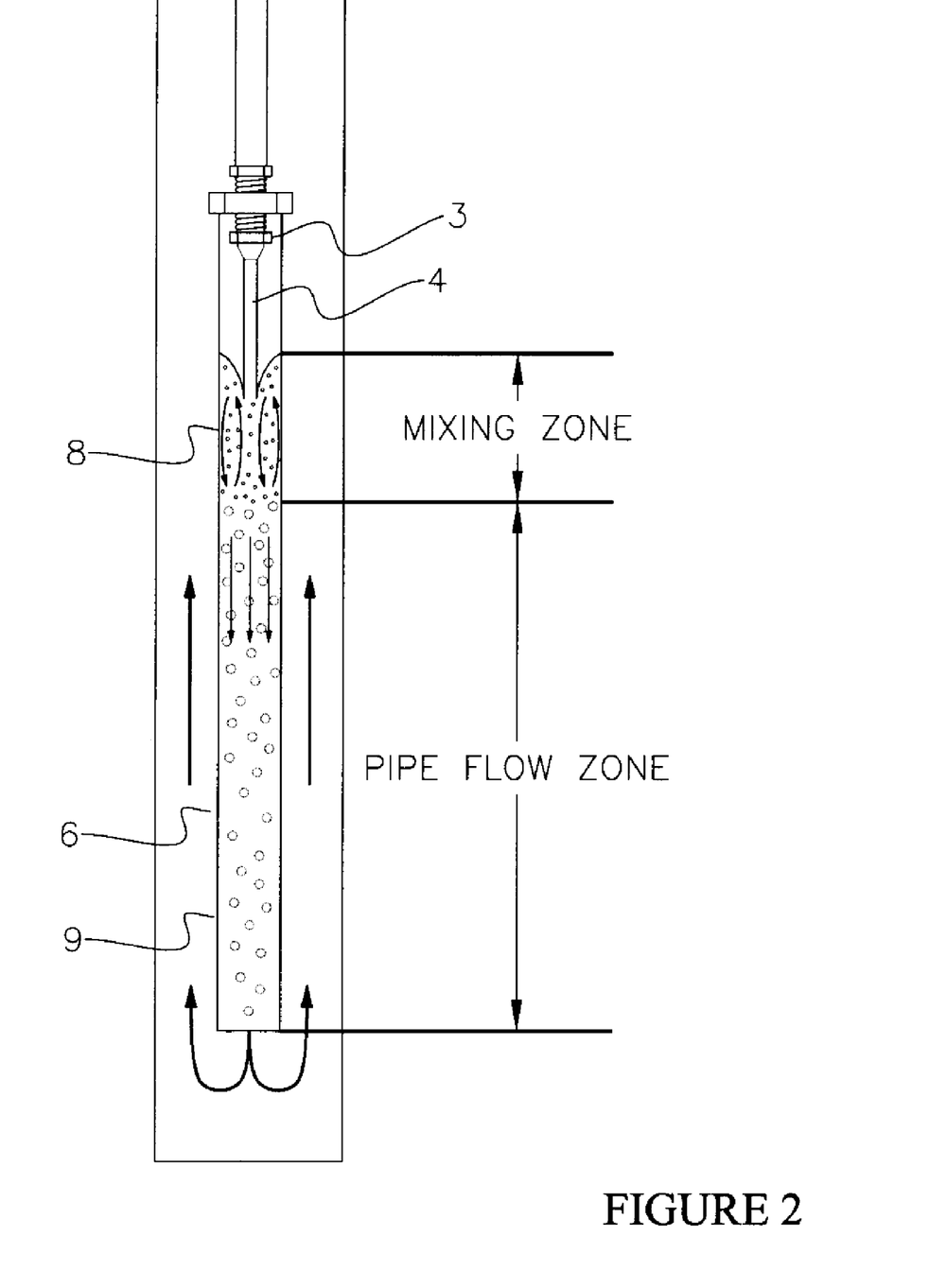
FIG. 2 shows a confined plunging liquid jet (CPLJ) contactor of the present invention.

FIG. 2 shows an embodiment of the present invention employing a CPLJ. In this embodiment pressurized liquid passes through an orifice 3 which is vertically oriented and creates a high velocity jet of fluid 4 that impinges into a body of fluid located beneath the orifice 3. Gas is either injected into the liquid upstream of the orifice or is drawn into the process at the point of impingement (FIG. 2, showing an embodiment of the present invention). The plunging jet impinges into a body of fluid that is confined by a downcomer 6. Near the point of impingement is a highly energetic, turbulent zone where the downward force of the plunging jet fights buoyancy forces of the entrained gas. This zone, called the mixing zone 8, is characterized by vigorous mixing of the gas and liquid and high gas to liquid surface area due to the small gas bubble size created by the impinging jet. It is in this zone where the bulk of the high-efficiency gas/liquid contacting occurs. Below the mixing zone is a zone called the pipe flow zone 9. This zone 9 is characterized by a less turbulent flow pattern where the liquid and excess gas flow downward and exit the downcomer 6.

Several researchers have studied CPLJ gas/liquid contactors. In one such study, the researchers measured mass transfer coefficients for a laboratory-scale CPLJ contactor. The researchers used these measurements to develop a mathematical description of mass transfer of carbon dioxide into water within a CPLJ (Evans, 1999). The empirical formula that they developed is expressed as:

$(k_L a)_{MIX} = 0.467 \epsilon_{diss}^{0.207} u_{G,in}^{0.697}$ $(k_L a)_{MIX}$ = mass transfer coefficient [1/s]

$\epsilon_{diss}$ = energy dissipation per unit volume [W/m3]

$U_{G,in}$ = gas feed rate [m/s]

The energy dissipation is described by the expression:

$$\epsilon_{diss} = \frac{\rho_L u_N^3}{2 L_{MIX}} [b - 2b^2 - b^3(1-\lambda)^2 + 2b^3(1+\lambda)]$$

$\rho_L$ = density of the liquid [kg/m$^3$]

$U_N$ = liquid velocity at the nozzle [m/s]

$L_{MIX}$ = length of the mixing zone [m]

$$b = \frac{F_N}{F_C}$$

$F_N$=cross-sectional area of the nozzle [m²]
$F_C$=cross-sectional area of the column [m²]

$$\lambda = \frac{Q_{G,in}}{Q_L}$$

$Q_{G,in}$=gas feed rate [m³/s]
$Q_L$=liquid feed rate [m³/s]

Though this empirical description is derived based on a small sampling of laboratory-scale CPLJ contactors, it gives valuable insight into the factors that control CPLJ efficiency. From this equation, it is apparent that the velocity of the impinging jet, which is a function of liquid flow rate and nozzle size, the diameter of the downcomer, and the length of the mixing zone are the major factors that control contacting efficiency.

The present technology typically uses a large gas/liquid contacting chamber to dissolve gasses into water for injection. The large gas/liquid contactors of the present art are sized to process all injection water at a remediation site and create a uniform dissolved gas concentration in that injection water, which is then passed though a manifold that routes the water to the injection wells.

SUMMARY OF THE INVENTION

In its method respects, the present invention provides a method for efficiently transferring gasses into solution in a liquid. The device has been used successfully for high-efficiency transfer of oxygen and ozone gasses into water. Ozone gas is an effective biocide and can be used for reduction of biofouling within distribution piping, ground-water wells, boreholes, infiltration trenches and leach fields, and within aquifer formations. However, the device can also be used for transferring a number of other gasses into solution for environmental remediation applications including, but not limited to, hydrogen, methane, butane, propane, sulfur hexafluoride, helium, and air.

In contrast to current gas transfer devices used for bioremediation, the present invention induces gas transfer by creating a confined plunging liquid jet (CPLJ) within a simple piping network or in a borehole. The prior art is based on diffusion of oxygen across a membrane, creation of small droplets within a pressurized spray chamber, or complicated down-well pump and piping configurations.

Where multiple injection wells are employed at a remediation site, the present invention typically sets up a separate gas/liquid contactor for each injection well. The present invention dedicated separate gas/liquid contacting chambers for each injection well are beneficial to increase operational flexibility by allowing the operator to dictate the amount of gas that is supplied to each injection well. Thus, a 50 gpm system according to the present invention having multiple injection wells could tailor the dissolved gas concentration to the remediation requirements at each injection well to conserve gas.

Thus, the present invention is an improvement over in-well gas/liquid contacting devices which are more complex than the present invention, are based on injection of large volumes of gas directly into the subsurface, and/or have very low dissolved gas delivery rates because they are based on diffusion of gas into the natural ground-water flow, which typically moves very slowly.

The present invention also relates to use of ozone to facilitate remediation by reducing biomass growth within injection well/aquifers. Ozone is typically applied in gaseous form to aquifers used in environmental remediation to break down containment chemicals. This aspect of the present invention differs from prior art in that the ozone is not used for remediation, but rather to facilitate remediation by reducing biomass growth within the injection well/aquifers.

Thus, the present invention provides a method for disinfecting a ground water remediation system comprising injecting a stream comprising water and ozone as a biofouling prevention agent into a ground water-containing subterranean formation. In an embodiment of the method the ozone is injected on a continuous or near continuous basis as a biofouling prevention agent through the ground water remediation system into a member of the group consisting of injection wells, infiltration trenches and leach fields. If desired the method sequentially: recycles ground water dosed with oxygen through the ground water remediation system into the contaminated aquifer for a first period of time; and injects municipal water dosed with the ozone through the ground water remediation system into the contaminated aquifer for a second period of time. Typically, the contaminated aquifer is selected from the group consisting of injection wells, infiltration trenches and leach fields.

DETAILED DESCRIPTION OF THE INVENTION

The invention includes (1) a pressurized water source, (2) a gas supply that provides high-purity gas for dissolution, (3) an orifice-type flow restriction oriented vertically within a pipe or borehole, and (4) piping, control valves, and measurement devices required for connection and control of the aforementioned components. The gas-enriched water is then introduced into the subsurface through a network of injection wells installed in the area where contamination is found.

PRESSURIZED WATER SOURCE: Water that is to be amended with dissolved gas is delivered to the system under pressure. The water used for the described process may be sourced from a municipal water supply, a surface water body such as a lake or river, ground water in the same or a different aquifer as the impacted aquifer, or any combination of these sources. Any pressure suitable to create the CPLJ is suitable for the present invention. A water source at a pressure of 40 to 80 pounds per square inch gauge (psig) or more is a typical range for water pressure into a device for performing the present invention. A water pressure of 60 psig, typical of that found in municipal water supplies, is a typical water pressure that is generally satisfactory for operation of the device. If the water is sourced from a surface water body or ground water, a pump may be employed to generate the 40 to 80, e.g., 60, pounds of water pressure for operation of the system. The total system pressure requirement is determined by the pressure loss across the system gas contacting orifices, the pressure loss due to the piping network, and the pressure required to inject water into the aquifer.

GAS SUPPLY: A high purity gas source is typically used for mass-transfer operations because the rate of gas dissolution increases with gas purity as described by Henry's Law. In some instances, however, it may be desirable to use a lower quality gas source due to economic or logistic considerations. The gas used for the process may be sourced from gas utility lines (i.e. natural gas), gas storage units that store gasses provided by a supplier, may be generated on-site or atmospheric gas may be used. In the case of oxygen and ozone, high-purity gasses can economically be generated on-site using gas purification/generation devices. One example of an on-site gas generation system is an AS-B pressure-swing absorption oxygen generator produced by AirSep Corporation of Buffalo, N.Y.

ORIFICE-TYPE FLOW RESTRICTION: An orifice-type flow restriction is required in the system to increase the velocity of the fluid within the contacting chamber. The reduced cross-sectional area of the orifice as compared to the piping preceding the orifice converts liquid pressure energy into momentum. A nozzle is typically used for the invention described to efficiently convert pressure energy to momentum energy. A number of nozzles are available to the practitioner, however, the preferred nozzle for this application creates an impinging jet of water. One example of an appropriate orifice nozzle is an SSJ Series #50 Solid stream jet nozzle, manufactured by AllSpray, LLC of Carol Stream, Ill.

SYSTEM PIPING, CONTROL VALVES, AND MEASUREMENT DEVICES: Polyvinyl chloride piping is typically used for construction of environmental remediation systems and is satisfactory for construction of the described device. Control valves are used to adjust system flow rates. The invention can be operated without control valves, however, operational capabilities are greatly improved by addition of valves to independently control water and gas flow rates. Measurement devices may also be installed to characterize water and gas pressures and flow rates within the system.

Vertical orientation of the nozzle is critical to the invention as the high efficiency gas transfer is induced by creating a confined plunging jet (CPLJ) gas/liquid contact area within the piping network or well. High-efficiency gas transfer is achieved in the CPLJ mixing zone where vigorous gas/liquid mixing occurs due to downward velocity of the liquid jet exiting the nozzle and the upward buoyancy of the entrained gas bubbles.

Figure 3:
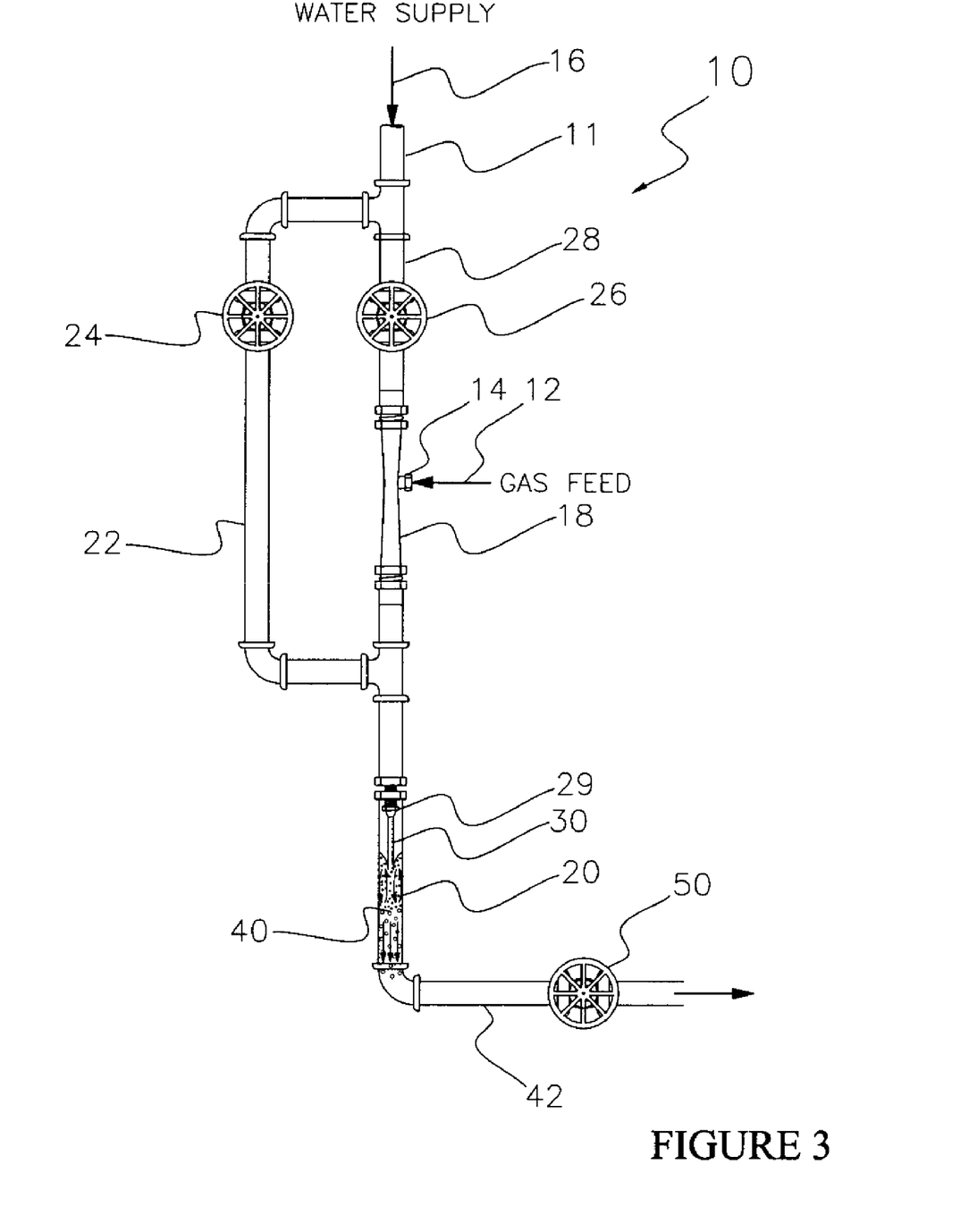
FIG. 3 shows an embodiment of a device to perform the present invention.

FIG. 3 shows a first embodiment of a device 10 for performing the present invention. The device contacts water and gases within a distribution manifold. It is typical that large ground-water contamination sites require multiple remediation wells for effective ground-water cleanup. It is common practice at such sites to construct remediation systems that have a common manifold in one centralized location that services the multiple remediation wells. One preferred configuration of the invention induces high-efficiency gas/liquid contacting within the manifold piping network without the need for a separate stand-alone gas liquid contacting device.

In the embodiment of FIG. 3, water stream 16 feeds inlet conduit 11 and gas stream 12 is injected into gas port 14 to mix with the water provided by water stream 16 in a venturi injector 18 upstream of a contacting chamber 20.

In a second embodiment (not shown) the embodiment of FIG. 3 is modified to replace the venturi injector 18 with a constant diameter pipe and the gas is injected either upstream of the nozzle (similar in location to that of FIG. 3). In a third embodiment (not shown) the embodiment of FIG. 3 is modified to replace the venturi injector 18 with a constant diameter pipe and the gas is injected within the contacting chamber 20 upstream of the CPLJ (similar in location to that of FIG. 5). In either the second or third embodiment, the pressure of the gas stream 12 is greater than the liquid pressure within the manifold at the point of gas injection to force the gas into the pressurized water stream.

A venturi-type injector, such as the Mazzei® Injector #484 manufactured by Mazzei Injector Corporation of Bakersfield California, may be used with the embodiment of FIG. 3 to reduce the gas pressure required for gas injection. Venturi injectors when employed in the present invention typically are gas-inducing injectors having an inlet port, an inlet section, a constricting section, a substantially cylindrical throat, an expansion section, and an outlet port sequentially arranged, and the injector port 14 entering the throat, the sections being proportioned and arranged to create a reduced pressure in the throat when the liquid feed stream 16 flows through from inlet port to outlet port. The liquid feed stream 16 flows through the injector 18 and the injecting treatment gas 12 flows into the liquid feed stream 16 through the injector port 14.

In this embodiment, a valve 26 may be employed within conduit 28 and an injector bypass line 22 having a valve 24 may also be installed to allow the operator to adjust the volumetric flow rate of water passing through the venturi injector 18. The gas-rich water feed is then passed as stream 30 through an orifice-type nozzle 29. The liquid and entrained gas stream 30 is discharged from the nozzle 29 at a sufficient velocity into a body of liquid located directly below the nozzle sufficiently close to the nozzle lower discharge end to create a confined plunging liquid jet (CPLJ) mixing zone 40 suitable for high efficiency gas/liquid contacting.

Any suitable configuration may be employed to maintain the level of the liquid in the contacting chamber 20 sufficiently high for proper interaction with the jet stream 30 discharged by the nozzle 29 to form the CPLJ. For example, the contacting chamber 20 may communicate with a discharge conduit 42 (FIG. 3) having a valve 50 to control flow out of the discharge conduit to match flow into the discharge conduit and maintain liquid level in the contacting chamber 20.

Figure 4:
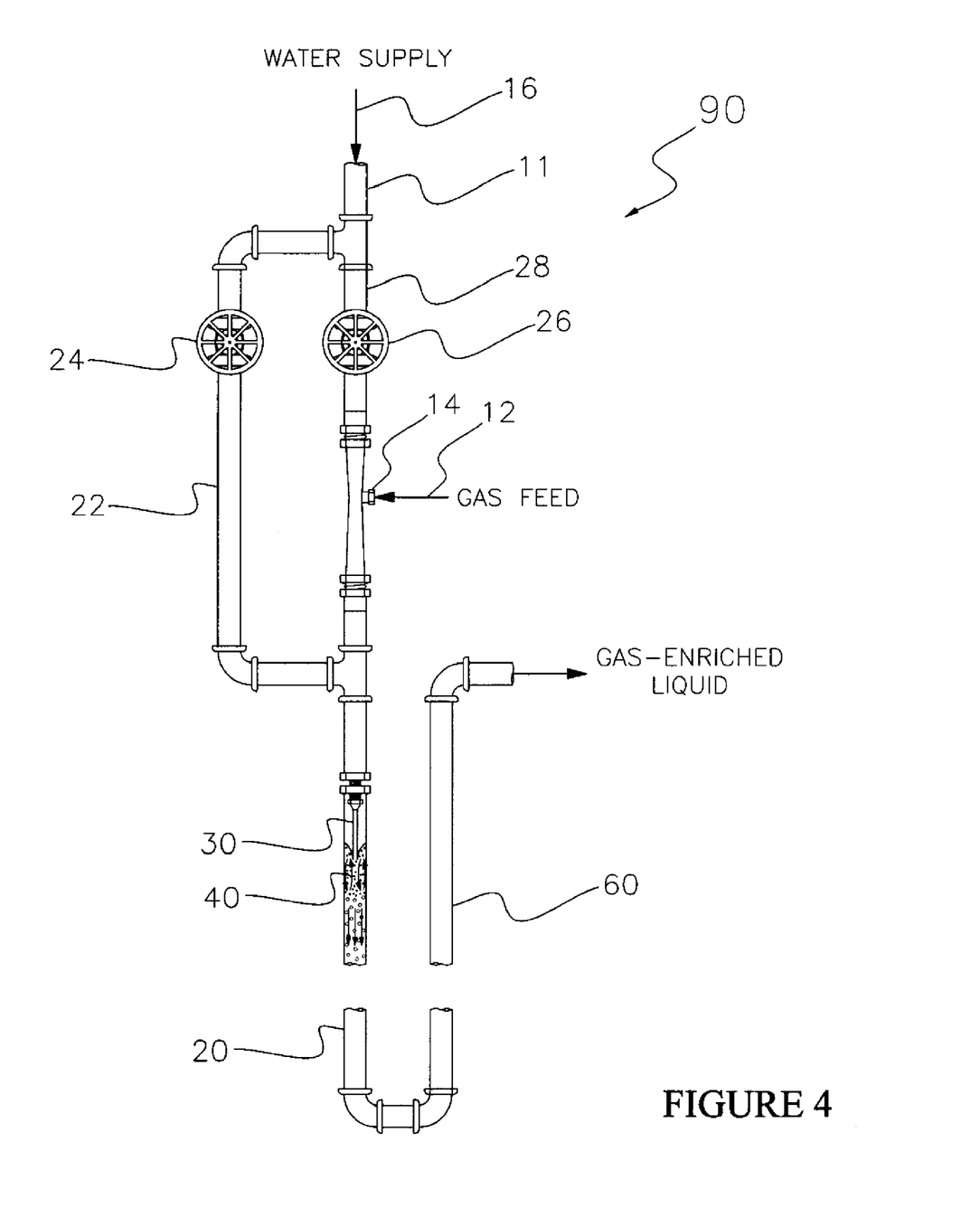
FIG. 4 shows an embodiment of a device to perform the present invention.

FIG. 4 shows a fourth embodiment of a device 90 wherein a U-bend and a vertical riser 60 is installed within the piping network to ensure a uniform volume of water at a sufficient level (height) is present within the CPLJ mixing zone 40 to ensure that impingement of the liquid jet stream 30 of liquid with entrained and/or absorbed gas discharged from the nozzle 29 occurs near the nozzle 29 where the liquid jet velocity is sufficiently great, preferably the greatest, to form the CPLJ.

Figure 5:
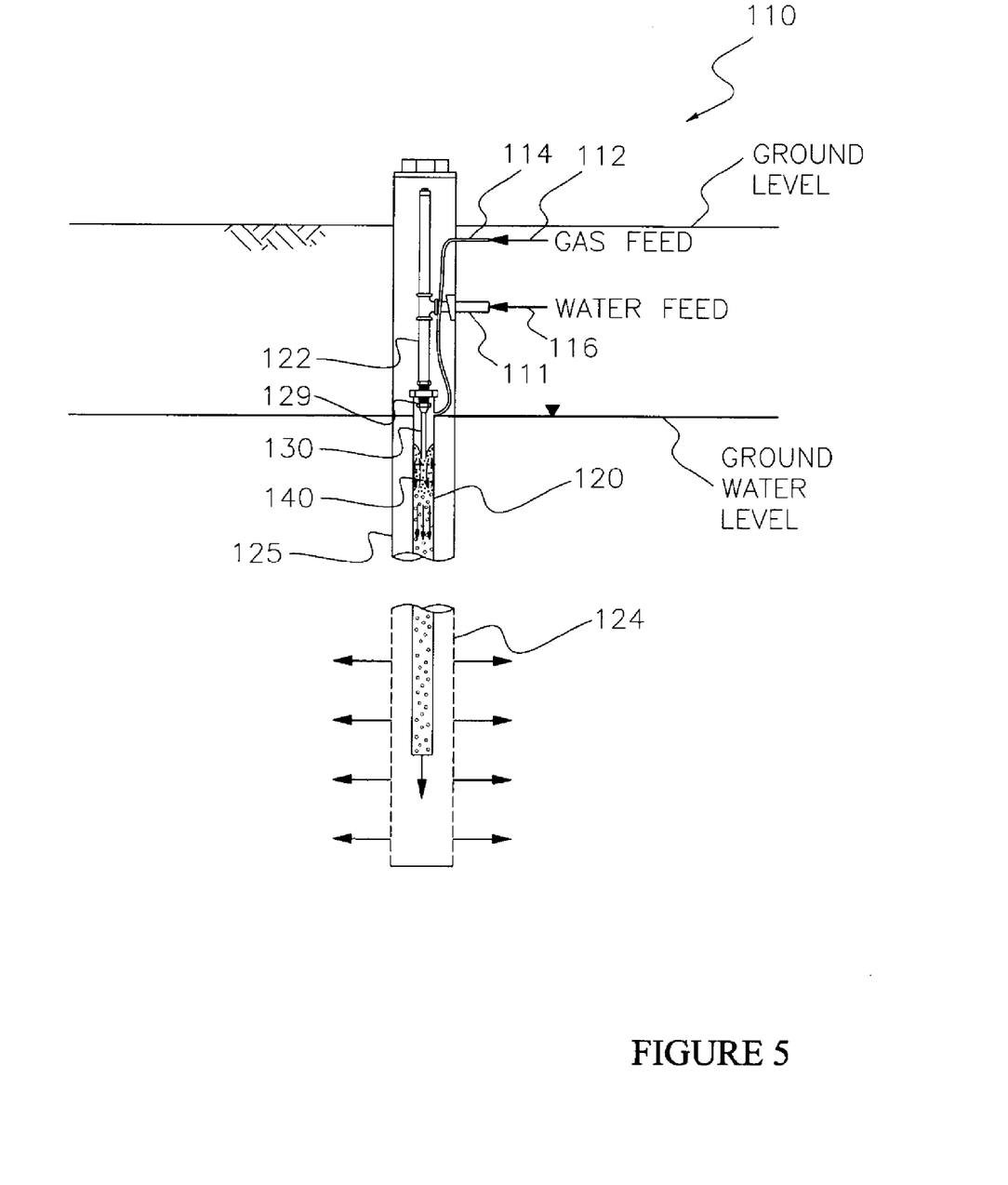
FIG. 5 shows an embodiment of a device to perform the present invention.

FIG. 5 shows a fifth preferred embodiment a device 110 to perform the present invention, to create a gas/liquid contacting chamber within a borehole. FIG. 5 shows a typical ground water level and typical ground level, but other ground water levels and/or ground levels may be suitable to cooperate with device 110.

The borehole is a hole bored or drilled in the earth. This embodiment has a drop pipe 122 communicating through a nozzle 129 to a downcomer 120. A well screen 124 is located at a lower portion of a well casing 125 placed in the borehole. The downcomer 120 is a vertical section of pipe within the borehole that is open ended. The downcomer 120 reduces the diameter of the mixing zone to improve efficiency. The casing 125 is a solid pipe placed within the borehole. The screen 124 is a perforated pipe typically attached to the bottom of the casing 125. The screen is used to allow water to enter the well and keep aquifer sediments out of the well. In this embodiment drop pipe 122 is a vertical section of piping within the borehole that transfers pressurized water to the elevation desired for cooperation with the nozzle 129. In this embodiment, water stream 116 is fed through water inlet port 111. Gas stream 112, containing ozone and/or other gasses, is injected into the water stream 111 within the downcomer 120. In the alternative (not shown) the gas may be fed into the drop pipe 122. The nozzle 129 for discharging stream 130 is installed at the upper end of this downcomer 120 and translates pressure energy within the drop pipe 122 into liquid momentum to create a CPLJ mixing zone 140. Pressurized water laden with the gas to be transferred is passed from the CPLJ mixing zone 140 through the downcomer 120, into the casing 125 and then through the well screen 124 at the lower end of the well casing 125 into the borehole. The diameter of the downcomer pipe 120 is smaller than the diameter of the casing 125 and can be the same or larger diameter than the drop pipe 122. The downcomer 120 creates a more effective and efficient CPLJ mixing zone 140 in very large boreholes or in boreholes where the injection water enters the aquifer directly from the CPLJ mixing zone. In a typical configuration, a solid stream nozzle 129 may be installed at the end of a one-inch drop pipe 122 within a six-inch diameter borehole. A two-inch diameter downcomer 120 may be attached to create a smaller CPLJ mixing zone 140 within the six-inch borehole.

Some boreholes do not need a downcomer where the diameter of the casing is suitably small for the CPLJ to occur. In some boreholes it may be beneficial to add a downcomer to the drop pipe.

In a sixth embodiment (not shown) the embodiment of FIG. 5 is modified to inject pressurized gas into drop pipe 122 upstream of the nozzle 129.

If desired, in a seventh embodiment (not shown) the embodiment of FIG. 5 is modified to inject pressurized gas into drop pipe 122 upstream of the nozzle 129 and this could be facilitated by employing a venturi chamber as in FIG. 3.

Figure 6:
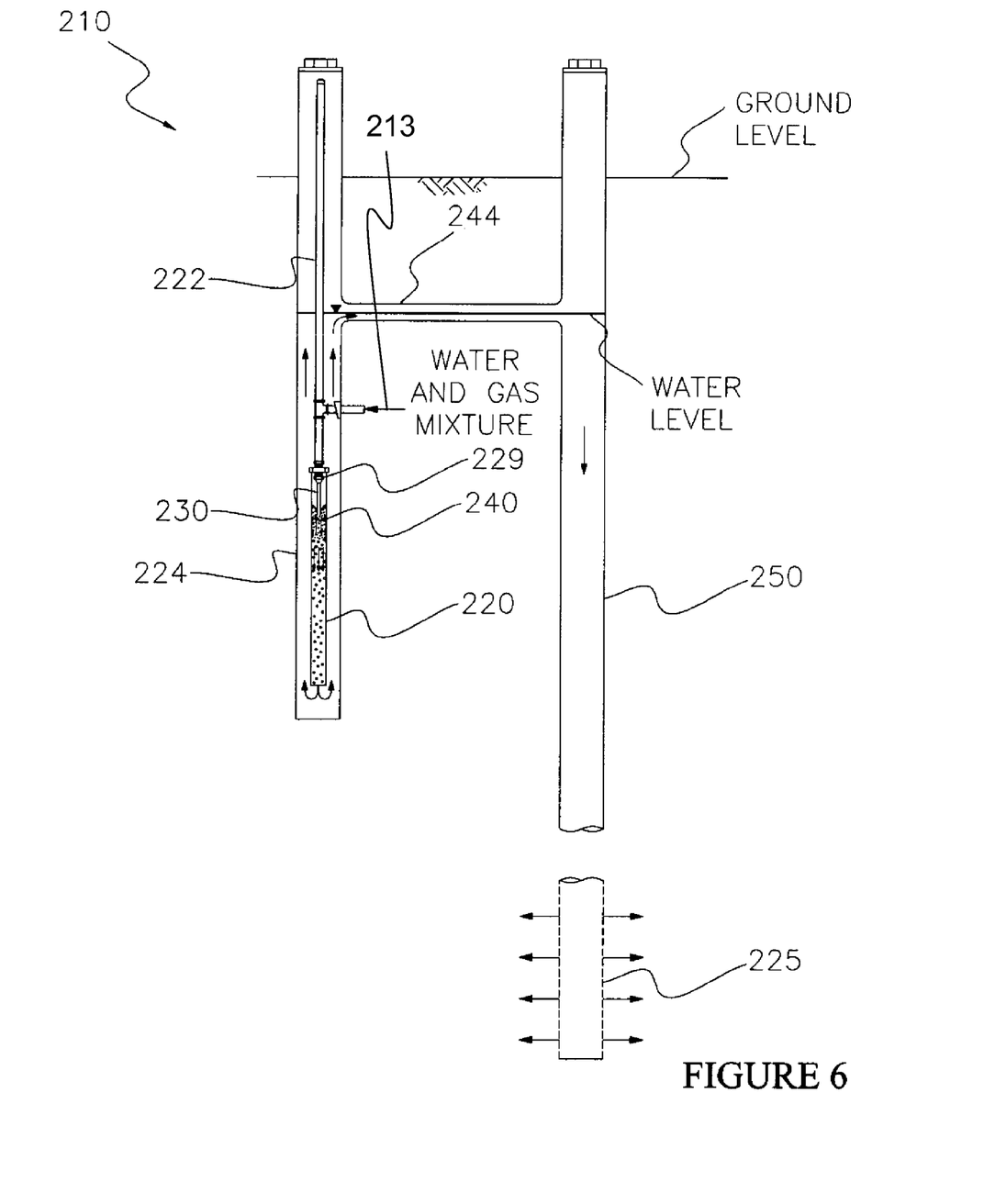
FIG. 6 shows an embodiment of a device to perform the present invention.

If desired the gas stream 112 may be initially injected into the water either within the borehole itself (for example as shown in FIG. 5) or at a remotely located manifold (for example as shown in FIG. 6 for gas and water stream 213).

FIG. 6 shows an eighth preferred embodiment of a device 210 for performing the present method. In device 210 a water and gas mixture is fed to a drop pipe 222 upstream of a nozzle 229. The nozzle 229 discharges a stream 230 into the downcomer 220 within a casing 224 within a borehole to establish the CPLJ zone 240 within the downcomer 220. Thus, the downcomer houses the CPLJ contactor. Casing 224 is a solid pipe placed within the borehole and acts as a riser. That is the water and gas downwardly discharged from downcomer 220 is directed to flow upwardly through an annular space defined within the casing 224. This casing 224 is plumbed to a second casing 250 configured as an injection well. Thus, the water and gas flowing through the annular zone of the casing 224 discharges through a connecting conduit 244 into second casing 250. Second casing 250 has a well screen 225 through which the water and gas are discharged into the subterranean formation. FIG. 6 shows a typical water level within the boreholes and typical ground level, but other borehole water levels and/or ground levels may be suitable to cooperate with device 210.

Figure 7:
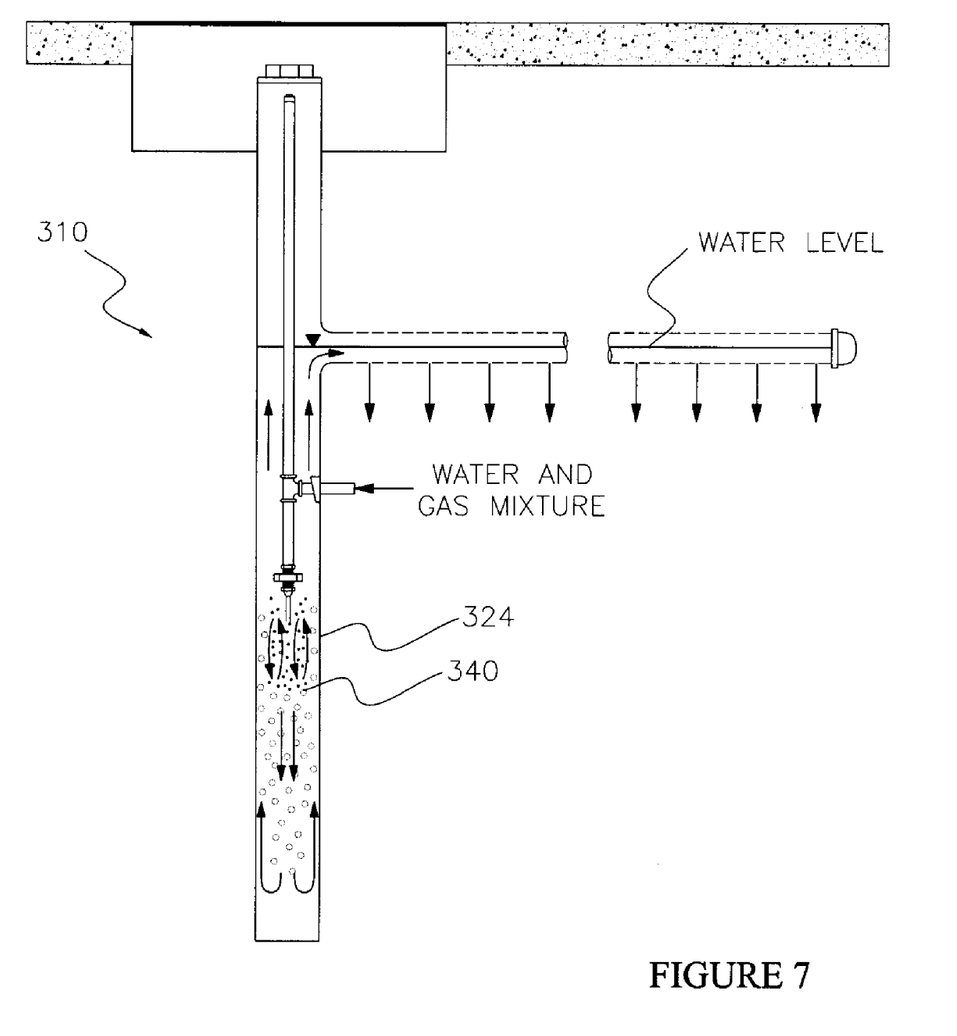
FIG. 7 shows an embodiment of a device to perform the present invention.

FIG. 7 shows a similar preferred embodiment 310 where water contacted in a CPLJ zone 340 within a casing 324 flows into horizontally installed leach fields (FIG. 7). FIG. 7 shows a typical water level within the boreholes and typical ground level, but other borehole water levels and/or ground levels may be suitable to cooperate with device 310.

Figure 8:
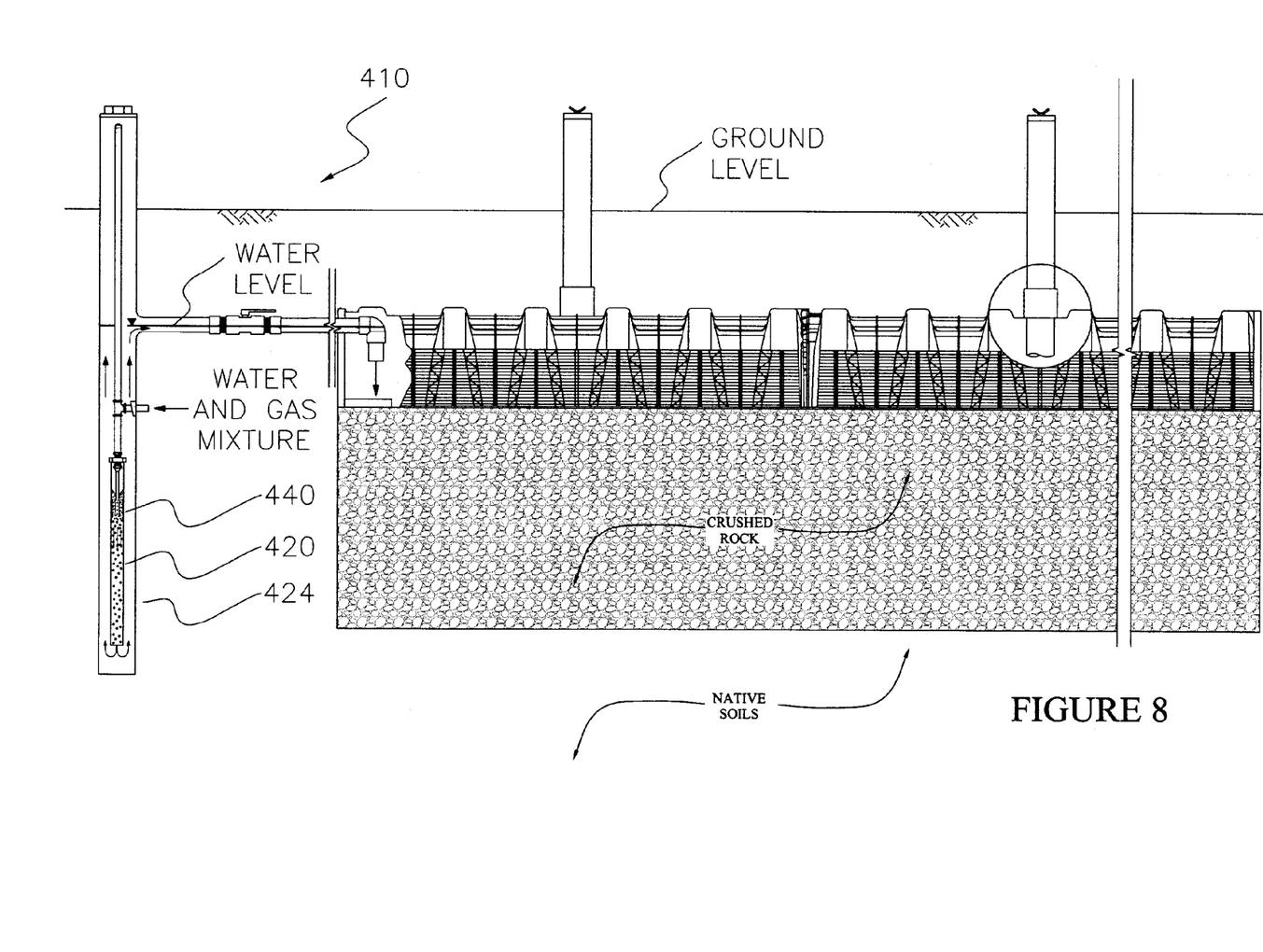
FIG. 8 shows an embodiment of a device to perform the present invention.

FIG. 8 shows a similar preferred embodiment 410 where water contacted in a CPLJ zone 440 within a downcomer 420 within a casing 424 flows into a horizontal infiltration trench (FIG. 8). FIG. 8 shows a typical water level within the boreholes and typical ground level, but other borehole water levels and/or ground levels may be suitable to cooperate with device 410.

In another embodiment (not shown), water contacted in the CPLJ zone discharges into a surface pond or trench and infiltrates into the subsurface.

The down-well gas/liquid contacting strategy is especially advantageous when dissolved ozone gas is to be injected. As discussed earlier, ozone is very reactive in nature and must be contacted at the point of application. The present invention also encompasses the use of ozone as a biofouling prevention agent in injection wells, infiltration trenches, and leach fields on a continuous or near continuous basis. One preferred way to do this would be to use high quality injection water and continuously add ozone to that injection fluid. However, another approach must be taken if the injection water is contaminated ground water. In many instances high quality water is too costly because of the high consumption for injection and/or hydraulic control over the injection process is desired. In these cases, the injection water is sourced from the impacted aquifer and the remediation system operates in a recirculation mode. Because the ozone residence time is negligible in contaminated ground water, it is desirable to use high-quality water for a short time on a regular basis to sterilize the injection wells/infiltration trenches. At a site where impacted ground water is recovered, oxygenated, and reinjected, a pilot test determined that there was a measurable reduction in biological activity in an injection well that received ozonated municipal water for one hour per day. Regular dosage of ozonated municipal water in the manner of the pilot test described above is a preferred configuration of the ozone disinfection method.

The above-described systems typically operate within the following parameters. However, any conditions which suffice to create a CPLJ and sufficient injection of the mixed gas and water into the subterranean formation will suffice for purposes of the invention.

VELOCITY OF WATER DISCHARGE FROM NOZZLE: 15 to 35 m/s;

CASING OR DOWNCOMER DIAMETER: 0.02 to 0.10 m;

DISTANCE FROM NOZZLE DISCHARGE TO TOP OF CPLJ: 0 to 0.3 m;

WATER SUPPLY PRESSURE: 40 to 80 psig;

WATER PRESSURE AT NOZZLE INLET: 10 to 40 psig;

GAS INLET PRESSURE: With a venturi injector installed the gas enters the flow stream under a vacuum that ranges from 2 to 20 inches of mercury. Without a venturi injector, the gas must overcome the pressure of the flow stream, which requires that the gas supply be pressurized to 10 to 20 psi greater than the pressure of the flow stream;

GAS TO LIQUID RATIO: A sufficient volume of gas must be supplied to maximize the dissolved gas content of the liquid, but a great excess of gas is not desirable due to cost. A typical operating range is 0.05 to 0.20 gas to liquid as a volume to volume ratio;

OZONE INLET GAS PARTIAL PRESSURE: The ozone partial pressure must be 1 to 10 percent of the feed gas to generate an effective sterilization solution.

EXAMPLES

Example 1

A system similar to the one described increased dissolved oxygen concentrations from less than 5 to 40 mg/L.

Tests were conducted with the described apparatus to determine system effectiveness under real-world conditions. The system configuration was similar to that shown in FIG. 5, with the exception that the gas to be contacted was added to the water feed upstream of the well, therefore an in-well gas feed line was not used. The tests were carried out in a 4-inch (0.10 m) diameter injection well in communication with ground water. Because of the small size of the well, a downcomer was not installed. Municipal water was pumped from a holding tank through a venturi injector located within a remediation building. The average water flow rate for the tests was $4.76 \times 10^{-5}$ m³/s. Gas to be contacted with the water was drawn into the gas inlet of the venturi inductor under vacuum. The average gas flow rate was $3.8 \times 10^{-5}$ m³/s. The water and gas mixture flowed approximately 90 m through subterranean piping to the injection well.

Two series of tests were conducted using oxygen gas for one test series and a mixture of ozone and oxygen gas for the other. The oxygen gas was greater than 95 percent oxygen and the balance was nitrogen. The partial pressure of the ozone gas was not quantifiable with the field instruments. However, it was estimated to be 1 to 2 percent ozone, with the balance being oxygen and nitrogen. Three nozzle configurations were field tested: a configuration with no nozzle and two configurations using catalog #545.000 and catalog #544.960, respectively, solid stream nozzles manufactured by Lechler GmbH+ Co KG, Metzingen, Germany.

Results of the tests conducted with oxygen gas are summarized in the following Table 1:

TABLE 1

| Parameter | First Comparative Example | 1 | 2 |
|---|---|---|---|
| NOZZLE (Model number) | None | 545.000 | 544.960 |
| NOZZLE DIAMETER (m) | N/A | 0.00589 | 0.00531 |
| LIQUID VELOCITY AT NOZZLE (m/s) | N/A | 17.5 | 21.5 |
| NOZZLE INLET PRESSURE (psig) | N/A | 19 | 28 |
| POST-VENTURI DISSOLVED OXYGEN CONCENTRATION (mg/L) | 21.9 | 31.5 | 29.3 |
| POST CPLJ DISSOLVED OXYGEN CONCENTRATION (mg/L) | 20.0 | 36.3 | 39.8 |

The data show the venturi inductor alone of the comparative example is a fair gas/liquid contacting device. However, the contacting efficiency is greatly increased by the in-well CPLJ contactors of Runs 1 and 2. The two nozzles tested had different size orifices, as shown in Table 1, which resulted in different nozzle velocities. The data shows that as the velocity of liquid at the nozzle increased, the post-CPLJ dissolved oxygen concentration increased. This holds with the logical assumption that more vigorous mixing of the liquid and gas would result in greater gas transfer.

Example 2

Results of the tests conducted with ozone gas are summarized in the following table 2:

TABLE 2

| Parameter | Second Comparative Example | 3 | 4 |
|---|---|---|---|
| NOZZLE | None | 545.000 | 544.960 |
| NOZZLE DIAMETER (m) | N/A | 0.00589 | 0.00531 |
| LIQUID VELOCITY AT NOZZLE (m/s) | N/A | 17.5 | 21.5 |
| NOZZLE INLET PRESSURE (atm) | N/A | 20 | 29 |
| POST CPLJ DISSOLVED OZONE CONCENTRATION (mg/L) | 0.3 | 0.4 | 0.7 |

Again, the data show that the CPLJ mixing zone increased the dissolved gas concentration and that the increase was greater at higher nozzle velocities.

It should be apparent that embodiments other than those specifically described above come within the spirit and scope of the present invention. Thus, it is respectfully submitted the present invention is not limited by the above description but is defined by the claims appended hereto.

I claim:

1. An apparatus for in situ groundwater decontamination within a subsurface region of earth comprising:
   a first conduit for passing a liquid feed stream therethrough;
   a second conduit;
   a gas port for injecting a treatment gas into at least one member of the group consisting of the first conduit and a second conduit;
   an orifice restriction located at a lower end of the first conduit for vertically discharging the liquid feed stream downwardly from the first conduit through the orifice restriction into the second conduit to form a confined plunging liquid jet gas and liquid contact zone in a vertically oriented upstream end portion of the second conduit to dissolve at least a portion of the treatment gas into the liquid feed stream in the contact zone to form an enhanced gas concentration liquid stream; and
   the second conduit in direct or indirect fluid communication with the subsurface region of earth, and
   wherein the first conduit is closed between the first conduit upstream end and contact zone except at the gas inlet port.

2. The apparatus of claim 1, wherein
   the first conduit comprises an upstream end and a downstream end;
   the second conduit comprises an upstream end and a downstream end;
   a source of the liquid feed stream under pressure is in fluid communication with the first conduit;
   the downstream end of the first conduit and the upstream end portion of the second conduit are axially vertically aligned;

the downstream end of the first conduit is directly over the orifice flow restriction;

the vertically oriented upstream end portion of the second conduit is directly underneath the orifice flow restriction and in fluid communication with the orifice flow restriction, a source of treatment gas is in fluid communication with the gas inlet port;

the second conduit downstream end is in direct or indirect fluid communication with the subsurface region of earth.

3. The apparatus of claim 1, wherein the apparatus is adapted for operation at pressures above atmospheric, wherein the orifice restriction is located at a downstream end of the first conduit and comprises a nozzle proportioned and arranged to increase the velocity of the liquid feed stream discharged into the second conduit, the nozzle having an orifice of less cross-sectional area than a transverse cross-section of the downstream end of the first conduit, and the nozzle for creating an impinging jet of liquid, the nozzle extending from the orifice restriction into the second conduit such that a downstream end of the nozzle is within the second conduit.

4. The apparatus of claim 1, wherein the orifice restriction is located at a downstream end of the first conduit and comprises a nozzle proportioned and arranged to increase the velocity of the liquid feed stream discharged into the second conduit, the nozzle having an orifice of less cross-sectional area than a transverse cross-section of the downstream end of the first conduit, and the nozzle for creating an impinging jet of liquid.

5. The apparatus of claim 1, wherein the orifice restriction is located at a downstream end of the first conduit and comprises a nozzle proportioned and arranged to discharge a solid stream jet.

6. An apparatus for in situ groundwater decontamination within a subsurface region of earth comprising:
a first conduit for passing a liquid feed stream therethrough;
a second conduit;
a gas port for injecting a treatment gas into at least one member of the group consisting of the first conduit and a second conduit;
an orifice restriction located at a lower end of the first conduit for vertically discharging the liquid feed stream downwardly from the first conduit through the orifice restriction into the second conduit to form a confined plunging liquid jet gas and liquid contact zone in a vertically oriented upstream end portion of the second conduit to dissolve at least a portion of the treatment gas into the liquid feed stream in the contact zone to form an enhanced gas concentration liquid stream; and
the second conduit in direct or indirect fluid communication with the subsurface region of earth, further comprising a manifold downstream of, and in fluid communication with, the second conduit, arranged for passing the enhanced gas concentration liquid stream from the second conduit into the manifold.

7. The apparatus of claim 5, wherein the gas port is upstream of the orifice restriction.

8. The apparatus of claim 1, wherein the first conduit comprises a gas-inducing injector having an inlet port, an inlet section, a constricting section, a substantially cylindrical throat, an expansion section, and an outlet port sequentially arranged, and an injector port entering the throat, the sections being proportioned and arranged to create a reduced pressure in the throat when the liquid feed stream flows through from inlet port to outlet port, flowing the liquid feed stream through the injector and the injecting treatment gas into the liquid feed stream through the injector port.

9. An apparatus for in situ groundwater decontamination within a subsurface region of earth comprising:
a first conduit for passing a liquid feed stream therethrough;
a second conduit;
a gas port for injecting a treatment gas into at least one member of the group consisting of the first conduit and a second conduit;
an orifice restriction located at a lower end of the first conduit for vertically discharging the liquid feed stream downwardly from the first conduit through the orifice restriction into the second conduit to form a confined plunging liquid jet gas and liquid contact zone in a vertically oriented upstream end portion of the second conduit to dissolve at least a portion of the treatment gas into the liquid feed stream in the contact zone to form an enhanced gas concentration liquid stream; and
the second conduit in direct or indirect fluid communication with the subsurface region of earth,
wherein the first conduit comprises a gas-inducing injector having an inlet port, an inlet section, a constricting section, a substantially cylindrical throat, an expansion section, and an outlet port sequentially arranged, and an injector port entering the throat, the sections being proportioned and arranged, to create a reduced pressure in the throat when the liquid feed stream flows through from inlet port to outlet port, flowing the liquid feed stream through the injector and the injecting treatment gas into the liquid feed stream through the injector port, wherein an injector by-pass line is provided for adjusting the volumetric flow of liquid through the injector.

10. An apparatus for in situ groundwater decontamination within a subsurface region of earth comprising:
a first conduit for passing a liquid feed stream therethrough;
a second conduit;
a gas port for injecting a treatment gas into at least one member of the group consisting of the first conduit and a second conduit;
an orifice restriction located at a lower end of the first conduit for vertically discharging the liquid feed stream downwardly from the first conduit through the orifice restriction into the second conduit to form a confined plunging liquid jet gas and liquid contact zone in a vertically oriented upstream end portion of the second conduit to dissolve at least a portion of the treatment gas into the liquid feed stream in the contact zone to form an enhanced gas concentration liquid stream; and
the second conduit in direct or indirect fluid communication with the subsurface region of earth,
wherein the second conduit or a location downstream of the second conduit comprises a means for maintaining the level of liquid in the second conduit.

11. The apparatus of claim 10, wherein the means for maintaining the level of liquid in the second conduit comprises a U-bend downstream of the confined plunging liquid jet gas and liquid contact zone.

12. The apparatus of claim 10, wherein the means for maintaining the level of liquid in the second conduit comprises a valve downstream of the confined plunging liquid jet gas and liquid contact zone.

13. The apparatus of claim 10, wherein the means for maintaining the level of liquid in the second conduit comprises a riser downstream of the confined plunging liquid jet gas and liquid contact zone.

14. The apparatus of claim 1, wherein the second conduit or a location downstream of the second conduit comprises a valve for maintaining the level of liquid in the second conduit.

15. An apparatus for in situ groundwater decontamination within a subsurface region of earth comprising:
a first conduit for passing a liquid feed stream therethrough;
a second conduit;
a gas port for injecting a treatment gas into at least one member of the group consisting of the first conduit and a second conduit;
an orifice restriction located at a lower end of the first conduit for vertically discharging the liquid feed stream downwardly from the first conduit through the orifice restriction into the second conduit to form a confined plunging liquid jet gas and liquid contact zone in a vertically oriented upstream end portion of the second conduit to dissolve at least a portion of the treatment gas into the liquid feed stream in the contact zone to form an enhanced gas concentration liquid stream; and
the second conduit in direct or indirect fluid communication with the subsurface region of earth,
wherein the second conduit comprises a downcomer for passing enhanced gas concentration liquid stream vertically downwardly therethrough and further comprises a riser downstream of, and in fluid communication with, the downcomer for passing enhanced gas concentration liquid stream vertically upwardly therethrough.

16. The apparatus of claim 15, wherein the enhanced gas concentration liquid stream flows into a manifold downstream of the riser.

17. The apparatus of claim 1, wherein the second conduit comprises a borehole.

18. An apparatus for in situ groundwater decontamination within a subsurface region of earth comprising:
a first conduit for passing a liquid feed stream therethrough;
a second conduit;
a gas port for injecting a treatment gas into at least one member of the group consisting of the first conduit and a second conduit;
an orifice restriction located at a lower end of the first conduit for vertically discharging the liquid feed stream downwardly from the first conduit through the orifice restriction into the second conduit to form a confined plunging liquid jet gas and liquid contact zone in a vertically oriented upstream end portion of the second conduit to dissolve at least a portion of the treatment gas into the liquid feed stream in the contact zone to form an enhanced gas concentration liquid stream; and
the second conduit in direct or indirect fluid communication with the subsurface region of earth,
wherein the orifice restriction is located at a downstream end of the first conduit and comprises a nozzle proportioned and arranged to discharge a solid stream jet,
wherein the nozzle is in direct fluid communication with a borehole.

19. The apparatus of claim 1, wherein the second conduit is in fluid communication with a borehole.

20. The apparatus of claim 1, wherein the treatment gas port is located to feed to the second conduit upstream of the contact zone.

21. The apparatus of claim 2, wherein
the orifice restriction is located at the downstream end of the first conduit and comprises a nozzle to discharge the liquid feed stream into the second conduit, the nozzle for creating an impinging jet of liquid water having a velocity of liquid water discharge from the nozzle of 15 to 35 m/s when the water pressure at the nozzle inlet is 10 to 40 psig;
the distance from the nozzle discharge to the top of the confined plunging liquid jet is 0 to 0.3 m;
wherein the gas port is for injecting treatment gas into the liquid feed stream in the at least one member of the group consisting of the first conduit and a second conduit at a gas inlet pressure of a vacuum from 2 to 20 inches of mercury wherein the apparatus comprises a venturi injector for passing the liquid feed stream therethrough and the gas port is in communication with the venturi injector to feed gas into the venturi injector.

22. The apparatus of claim 2, wherein
the orifice restriction is located at the downstream end of the first conduit and comprises a nozzle to discharge the liquid feed stream into the second conduit, the nozzle for creating an impinging jet of liquid water having a velocity of liquid water discharge from the nozzle of 15 to 35 m/s when the water pressure at the nozzle inlet is 10 to 40 psig;
the distance from the nozzle discharge to the top of the confined plunging liquid jet is 0 to 0.3 m;
wherein the gas port is for injecting treatment gas into liquid feed stream in the at least one member of the group consisting of the first conduit and a second conduit at a gas inlet pressure of 10 to 20 psi greater than the pressure of the liquid feed stream into which the gas is injected if the liquid feed stream passes through and is discharged from the first conduit in the absence of a venturi injector for passing the liquid feed stream therethrough.

* * * * *